March 21, 1944. C. G. DOWD 2,344,540
TOOL RACK
Filed Aug. 9, 1941
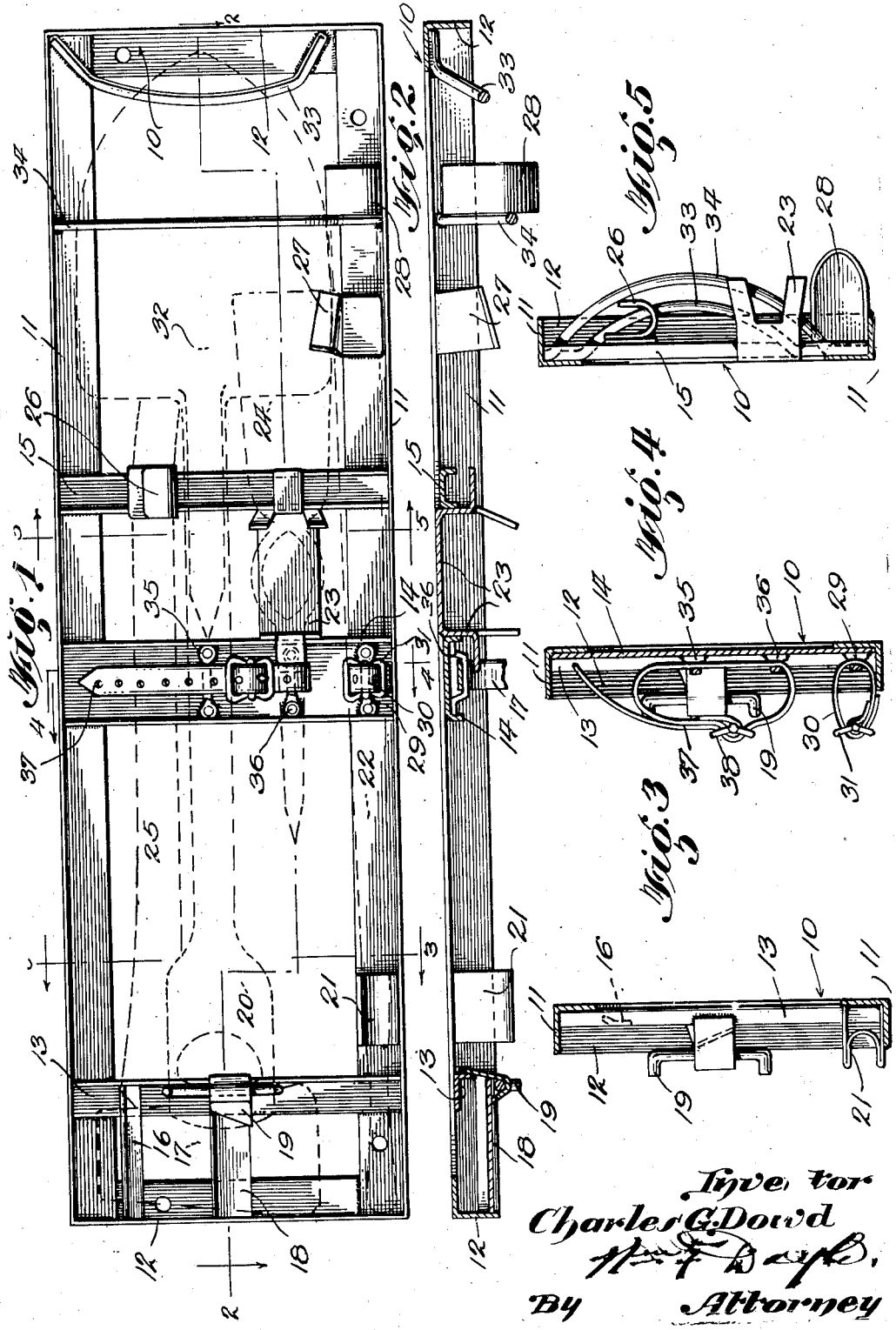
Inventor
Charles G. Dowd
By  Attorney Patented Mar. 21, 1944

2,344,540

UNITED STATES PATENT OFFICE 2,344,540

TOOL RACK

Charles G. Dowd, Baltimore, Md.

Application August 9, 1941, Serial No. 406,221

2 Claims. (Cl. 211—60)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to and has for a purpose the provision of a tool rack, particularly adapted for use on motor vehicles, and is especially adapted to store the tools in a compact yet readily accessible manner on the motor vehicle.

An object of this invention is to provide a tool rack that can be attached to the sides or rear or the inside of a motor vehicle, more especially a truck, where the operator can at his convenience remove the tools for any purpose in his work and as easily replace the tools in the rack.

Another object of this invention is to provide a tool rack that will retain the tools in a specially constructed holder or container of simple and inexpensive construction and is adapted to prevent accidental displacement of the tools, although, as pointed out, permit each tool to be individually removed with ease when desired.

Further advantages and objects of the invention will appear from the following detailed description taken in connection with the accompanying drawing in which:

Fig. 1 is a top plan view of the device.

Fig. 2 is a longitudinal section on line 2—2 of Fig. 1 in the direction of the arrows.

Fig. 3 is a transverse section on line 3—3 of Fig. 1.

Fig. 4 is a transverse section on line 4—4 of Fig. 1.

Fig. 5 is a transverse section on line 5—5 of Fig. 1.

Reference now being made to the drawing by numeral, 10 indicates the implement bracket frame which is adapted to be attached to a motor vehicle, not shown. The frame 10 is formed by the sides 11 and ends 12, which are joined together in any suitable manner. Cross members 13, 14 and 15 are secured to the sides 11, as shown.

Secured between end 12 and cross member 13 is an ax head rest 16, which is adapted to hold the ax head 17, shown in dotted lines, in a comparatively fixed position when the ax head is inserted in ax bit sheath 18. Rigidly secured to the ax bit sheath 18 and cross member 13 is the shovel handle rest bracket assembly 19 which is adapted to receive the hand grip portion 20 of the shovel 32, shown in dotted lines.

Secured to one of the sides 11 between cross members 13 and 14 is the pick mattock handle cradle 21, which is adapted to receive the rear end of the pick mattock handle 22, shown in dotted lines.

Positioned between cross members 14 and 15 and rigidly secured thereto is the pick mattock support bracket 23, which is adapted to securely receive the eye portion of the pick mattock 24, shown in dotted lines. In this position the bit of the pick mattock is adapted to rest on the pick mattock anchor bracket 27.

Secured to cross member 15 in such a position that the ax handle 25 can be received therein is the ax handle clip 26. When the rear end of the pick mattock handle 22 is placed in the cradle 21 in the frame 10, the forward end of the handle is adapted to be inserted in the pick mattock handle retainer 28. Secured by well known means to cross member 14 and parallel to the pick mattock handle 22 is a strap loop 29 which is adapted to receive a strap 30 having a buckle 31 thereon. The strap 30 is adapted to encircle the pick mattock handle and by means of the buckle 31 securely hold the pick mattock handle in place within the frame 10.

When the shovel 32 is placed in the frame 10, the point of the blade portion is adapted to be inserted under the shovel retainer rod 33 and the shovel proper is adapted to be supported thereon by shovel support rod 34.

Strap loops 35 and 36 are secured to the cross member 14 and are adapted to receive strap 37 having a buckle 38 thereon. Therefore, when the ax, shovel and pick mattock are placed in the frame 10 the strap 37 is adapted to encircle the aforementioned tools and thereby fasten them securely in place in the frame.

The use of the device as a tool rack is quite obvious; considering the tools' position in the rack, it is only necessary to loosen the straps to easily withdraw the tools from the rack. The tools are as easily replaced by inserting the tools in the proper retainers in the frame. The tool rack described is primarily used on a motor vehicle to keep the tools in a compact manner so that they can be easily and quickly removed or inserted.

It will be obvious to those skilled in the art that various changes may be made in the device without departing from the spirit of the invention and therefore the invention is not to be understood as limited to what is shown in the drawing and described in the specification, since these may be modified within the scope of the appended claims without departing from the spirit and scope of the invention.

Having thus described the invention, what is claimed as new and desired to secure by Letters Patent is:

1. A tool rack comprising a rectangular frame made of angle iron, said frame being provided with angle irons and channels positioned transversely of said frame for strengthening said frame, retaining means positioned on said transverse angle irons and channels for retaining a tool in said frame, said means including straps for fastening said tool against movement in said frame, an arched rod secured to one end of said frame adapted to receive a shovel blade, and a bracket on a transverse angle iron at the opposite end of the frame adapted to support a shovel handle.

2. A tool rack comprising a rectangular frame made of angle iron, said frame being provided with angle irons and channels positioned transversely of said frame for strengthening said frame, retaining means positioned on said transverse angle irons and channels for retaining a tool in said frame, said means including straps for fastening said tool against movement in said frame, a pair of arched rods spaced unequally from one end of said frame and having the tops of the arches an unequal distance from the plane of said frame, said rods being adapted to receive and support a shovel blade, and a bracket on an angle iron at the other end of the frame adapted to support a shovel handle.

CHARLES G. DOWD.